US011885480B1

(12) United States Patent
Lacroix

(10) Patent No.: US 11,885,480 B1
(45) Date of Patent: Jan. 30, 2024

(54) MOUNTING PLATE FOR RECESSED LIGHTING

(71) Applicant: Steve Lacroix, Saint-Jean-sur-Richelieu (CA)

(72) Inventor: Steve Lacroix, Saint-Jean-sur-Richelieu (CA)

( * ) Notice: Subject to any disclaimer, the term of this patent is extended or adjusted under 35 U.S.C. 154(b) by 0 days.

(21) Appl. No.: 17/971,710

(22) Filed: Oct. 24, 2022

(51) Int. Cl.
*F21V 21/04* (2006.01)

(52) U.S. Cl.
CPC .................................. *F21V 21/049* (2013.01)

(58) Field of Classification Search
CPC ...... F21V 21/049; F21V 21/048; F21S 8/026; F21S 8/043; F21S 8/06
USPC ......................................... 362/404, 148, 150
See application file for complete search history.

(56) References Cited

U.S. PATENT DOCUMENTS

| | | | | |
|---|---|---|---|---|
| 10,591,146 | B1 * | 3/2020 | Berry | F21V 21/047 |
| 10,760,751 | B1 * | 9/2020 | Bowen | F21V 21/048 |
| 11,280,481 | B1 * | 3/2022 | Yeats | F21S 8/043 |
| 2008/0259614 | A1 * | 10/2008 | Fryzek | F16M 13/027 362/382 |
| 2020/0300428 | A1 * | 9/2020 | Momin | F21V 21/04 |

* cited by examiner

*Primary Examiner* — Laura K Tso
(74) *Attorney, Agent, or Firm* — Benoit&Cote Inc.; Charles-Andre Caron

(57) ABSTRACT

A mounting plate mounting plate for a recessed light fixture comprising a body which is flat and which extends in a plane, the body being pierced with an opening which is substantially circular; a portion of material forming a central target at a center of the opening; and at least one branch which bridges the central target to the body. The central target is to be illuminated by a laser light for proper placement (alignment). The at least one branch can be bent upwardly and away from the center of the opening to retain an electrical wire of a transformer on the mounting plate, immediately aside a dedicated opening for easy retrieval, making the installation faster and avoiding spilling mineral wool from the roof by manual searching of such an electrical wire.

20 Claims, 7 Drawing Sheets

100

100 providing a mounting plate comprising a flat body pierced with an opening which is substantially circular, for example with an extender, with a portion of material forming a central target at a center of the opening and at least one branch which bridges the central target to the body

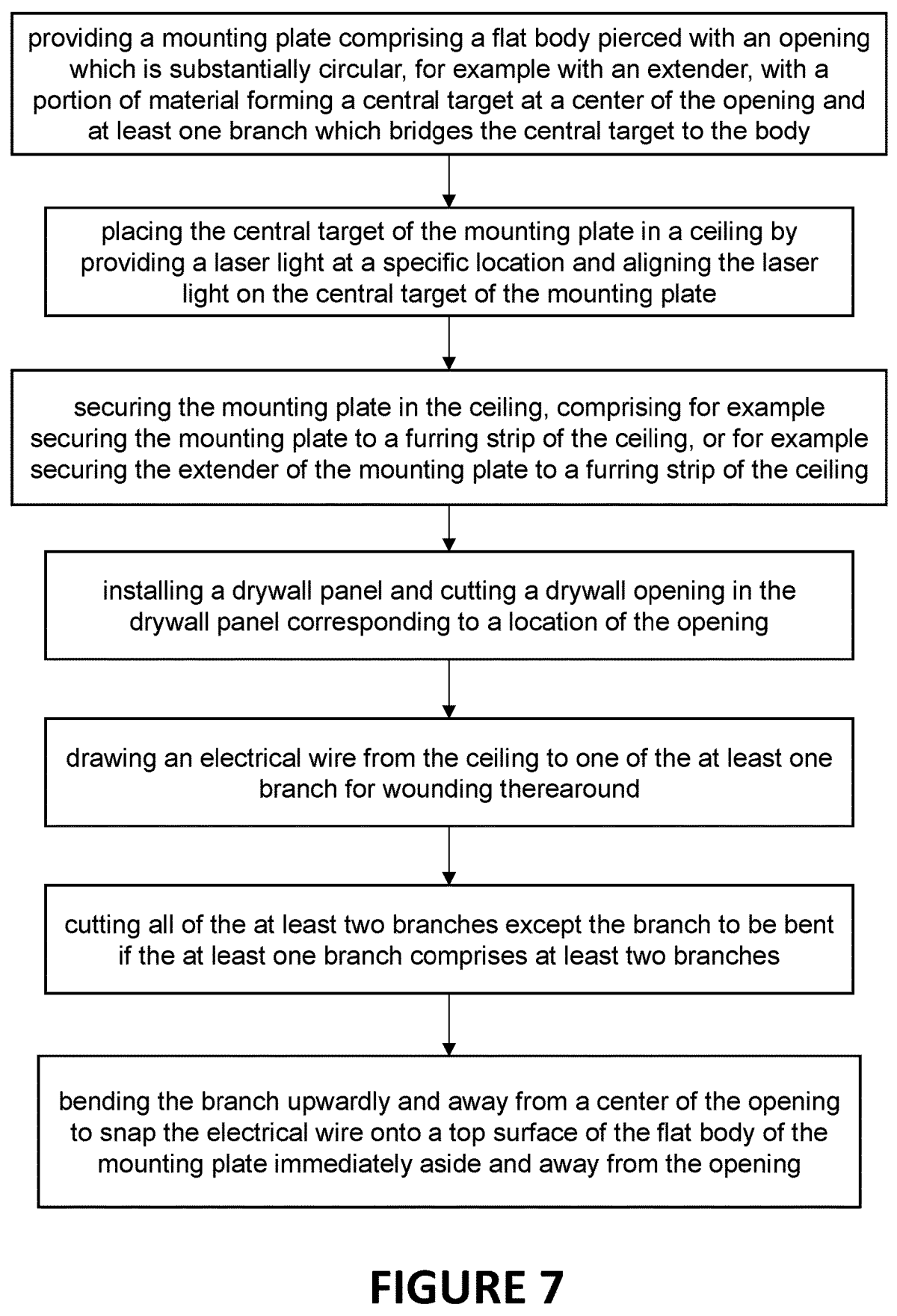

↓ placing the central target of the mounting plate in a ceiling by providing a laser light at a specific location and aligning the laser light on the central target of the mounting plate

↓ securing the mounting plate in the ceiling, comprising for example securing the mounting plate to a furring strip of the ceiling, or for example securing the extender of the mounting plate to a furring strip of the ceiling

↓ installing a drywall panel and cutting a drywall opening in the drywall panel corresponding to a location of the opening

↓ drawing an electrical wire from the ceiling to one of the at least one branch for wounding therearound

↓ cutting all of the at least two branches except the branch to be bent if the at least one branch comprises at least two branches

↓ bending the branch upwardly and away from a center of the opening to snap the electrical wire onto a top surface of the flat body of the mounting plate immediately aside and away from the opening

FIGURE 7

MOUNTING PLATE FOR RECESSED LIGHTING

BACKGROUND

(a) Field

The subject matter disclosed generally relates to lighting fixtures. More specifically, it relates a fixture for ceiling recessed lighting.

(b) Related Prior Art

Light fixtures to be installed in a ceiling can be a challenge to install properly. This is especially pronounced in contexts such as the building of large commercial or industrial facilities, in which the light fixtures may need to be installed in great numbers and at a high pace. This, however, may lead to installation defects such as a misalignment of the light fixtures in a ceiling. Fig. 1 illustrates a prior-art-related issue of having light fixtures misaligned due to the alignment having been made manually.

To address this issue, the industry of lighting installation sometimes makes use of a ring, as shown in Fig. 2 (illustrating a prior-art ring). This is also known as a mounting plate for recessed downlights, or plaster ring as it is installed within a drywall panel of the ceiling. By aligning these ring-shaped mounting plates in a ceiling, the light fixtures can eventually be aligned too.

However, installation still takes time as the ring-shaped mounting plates need to be aligned, for example by having two people working together to perform alignment and installation. This issue needs to be addressed.

SUMMARY

According to an aspect, there is disclosed a mounting plate for a recessed light fixture comprising:

- a body which is flat and which extends in a plane, the body being pierced with an opening which is substantially circular,
- a portion of material forming a central target at a center of the opening;
- at least one branch which bridges the central target to the body.

According to an embodiment, the at least one branch comprises at least two branches.

According to an embodiment, the at least two branches comprise three branches.

According to an embodiment, the three branches are angularly equidistant from each other, forming a shape of a Y.

According to an embodiment, the target is formed as a dot connecting the three branches at a center thereof.

According to an embodiment, the target formed as a dot has a diameter between about 0.3" and about 0.8".

According to an embodiment, the target formed as a dot has a diameter between about 0.5" and about 0.6".

According to an embodiment, the branches have a width between about 0.10" and about 0.15".

According to an embodiment, the branches have a thickness between about 0.01" and about 0.05".

According to an embodiment, the body and the at least one branch are made of galvanized steel.

According to an embodiment, the body is longer in a direction, forming an extender of the mounting plate.

According to another aspect, there is disclosed a method of installing a mounting plate in preparation of installation of a recessed light fixture, comprising the steps of:

- providing a mounting plate comprising a flat body pierced with an opening which is substantially circular, with a portion of material forming a central target at a center of the opening and at least one branch which bridges the central target to the body;
- placing the central target of the mounting plate in a ceiling by providing a laser light at a specific location and aligning the laser light on the central target of the mounting plate; and
- securing the mounting plate in the ceiling.

According to an embodiment, there is a further step of installing a drywall panel and cutting a drywall opening in the drywall panel corresponding to a location of the opening.

According to an embodiment, securing the mounting plate in the ceiling comprises securing the mounting plate to a furring strip of the ceiling.

According to an embodiment, providing the mounting plate comprises providing the mounting plate with the flat body having an extender, and securing the mounting plate in the ceiling comprises securing the extender of the mounting plate to a furring strip of the ceiling.

According to an embodiment, there are further step of:

- drawing an electrical wire from the ceiling to one of the at least one branch for wounding therearound; and
- bending the branch upwardly and away from a center of the opening to snap the electrical wire onto a top surface of the flat body of the mounting plate immediately aside and away from the opening.

According to an embodiment, the at least one branch comprises at least two branches, further comprising the step of, prior to bending the branch, cutting all of the at least two branches except the branch to be bent.

According to another aspect, there is disclosed a method of installing a mounting plate in preparation of installation of a recessed light fixture, comprising the steps of:

- providing a mounting plate comprising a flat body pierced with an opening which is substantially circular, with a branch extending in the opening;
- securing the mounting plate in the ceiling;
- drawing an electrical wire from a ceiling to the branch for wounding therearound; and
- bending the branch upwardly and away from a center of the opening to snap the electrical wire onto a top surface of the flat body of the mounting plate immediately aside and away from the opening.

According to an embodiment, there is a further step of installing a drywall panel and cutting a drywall opening in the drywall panel corresponding to a location of the opening.

According to an embodiment, securing the mounting plate in the ceiling comprises securing the mounting plate to a furring strip of the ceiling.

BRIEF DESCRIPTION OF THE DRAWINGS

Further features and advantages of the present disclosure will become apparent from the following detailed description, taken in combination with the appended drawings, in which:

FIG. 7 is a flowchart illustrating a method of installing a mounting plate in preparation of installation of a recessed light fixture, according to an embodiment of the disclosure.

It will be noted that throughout the appended drawings, like features are identified by like reference numerals.

DETAILED DESCRIPTION

Figure 1:
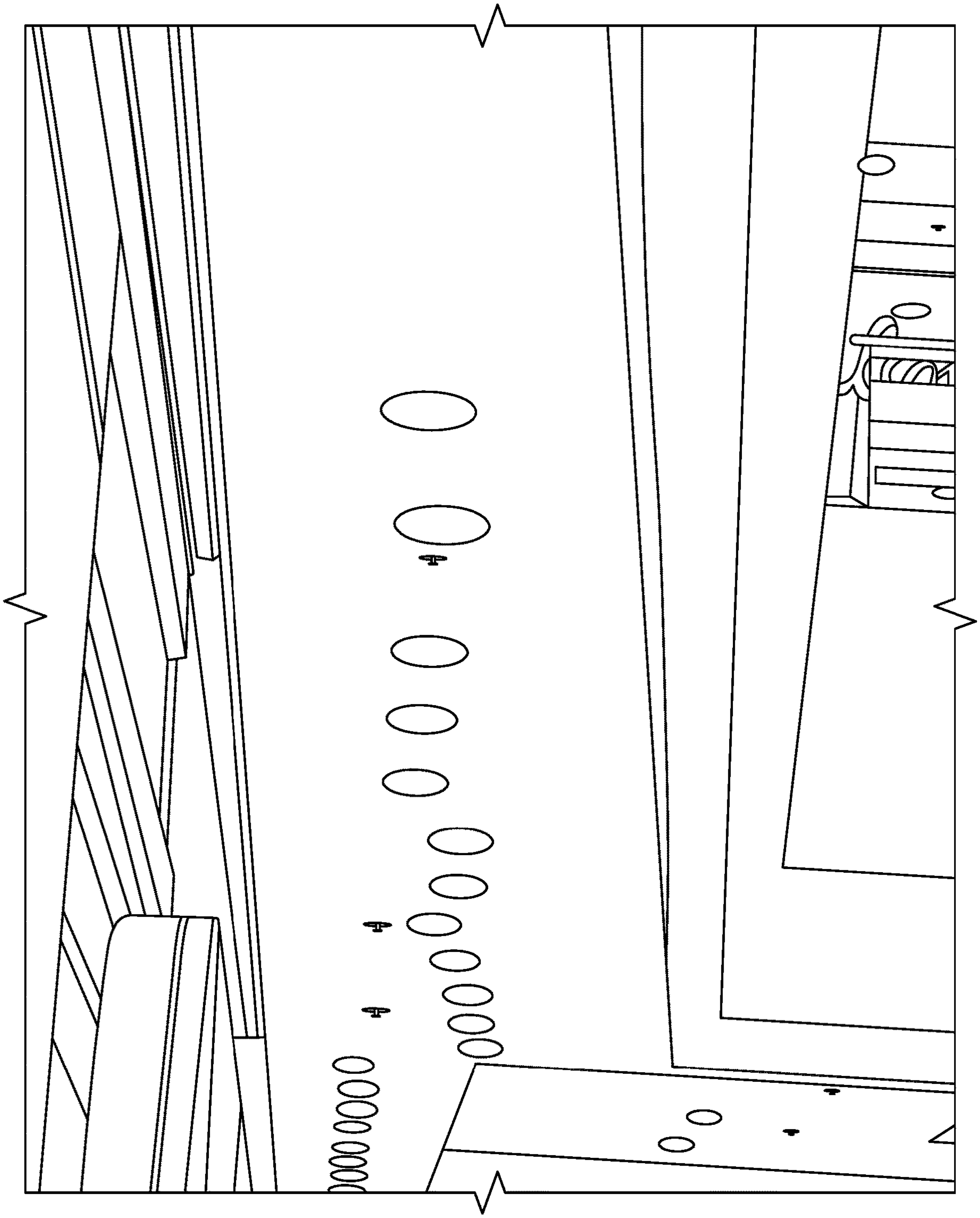
FIGURE 1 PRIOR ART
FIG. 1 is a picture illustrating light fixtures installed without any ring-shaped mounting plate and being thereby misaligned, according to the prior art.

In the prior art, there are different ways of ensuring that the ceiling openings for receiving recessed downlights are properly located in the drywalls. A first way, without any guiding mounting plate, involves the electrician making manual marks on the floor under the drywall panels to be installed to indicate where the recessed light fixture openings are to be made once the drywall panels are installed. This is inefficient as it requires a double displacement by the electrician a first one to do the floor markings, and a second one to install the light fixtures in the drywall panels in the openings that were made in the drywall panels based on the floor markings. Also, alignment can be hard to make, starting from the floor markings, and the process is imprecise. If not done properly, it can lead to misalignments as shown in FIG. 1 (prior art). Another variant of that method is to indicate locations on a plan, but this is also prone to errors and misalignments.

Figure 2:
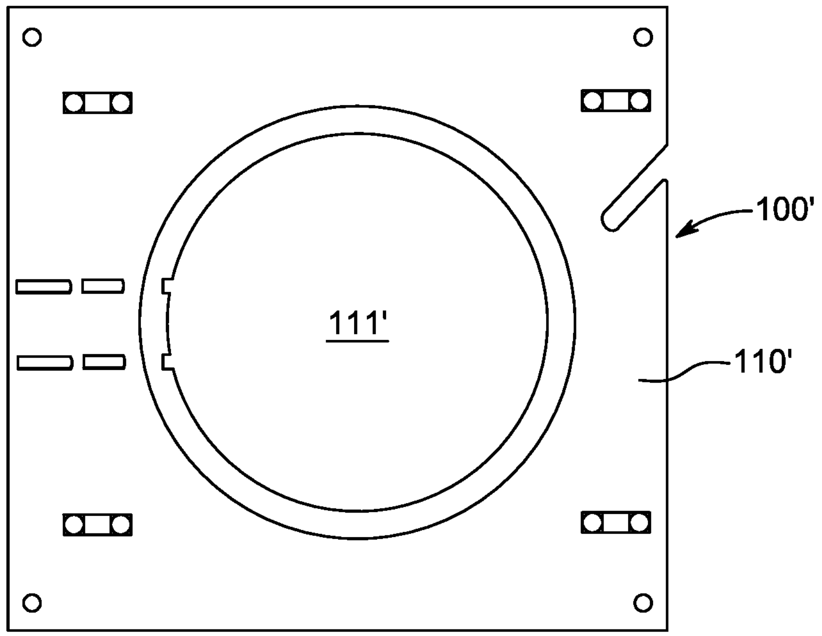
FIGURE 2 PRIOR ART
FIG. 2 is a front view illustrating a ring-shaped mounting plate, according to the prior art.
Figure 3:
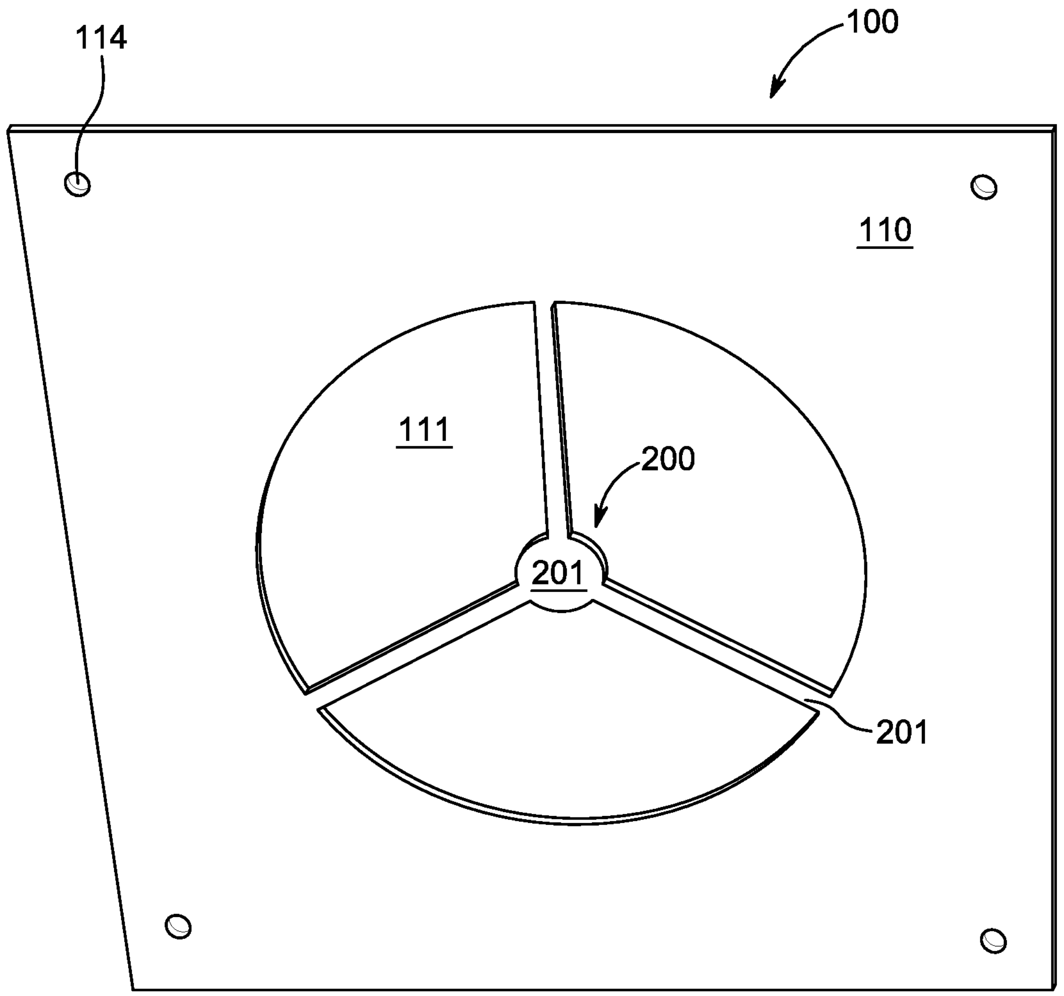
FIG. 3 is a front view illustrating a ring-shaped mounting plate with a branched target, according to an embodiment of the disclosure.
Figure 4:
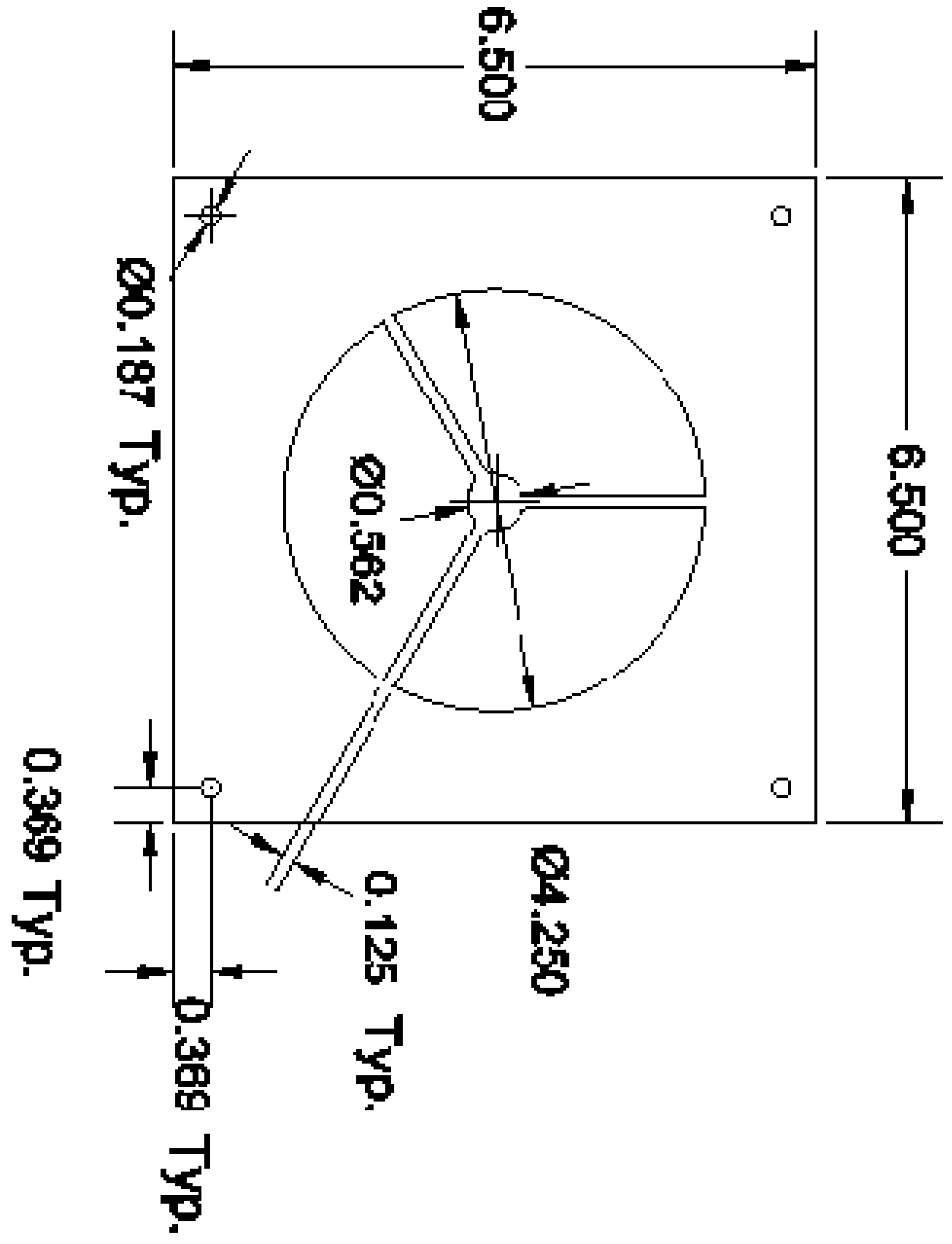
FIG. 4 is a schematic view illustrating the ring-shaped mounting plate with a branched target of FIG. 3, according to an embodiment of the disclosure.

To address this issue, and as mentioned above, there are prior-art ring-shaped mounting plates 100' as shown in FIG. 2 which can be installed in the ceiling prior to the installation of drywall panels in the ceiling. This ring-shaped mounting plates fix the location of the eventual recessed light fixture to be installed at that location. Therefore, if the ring-shaped mounting plate is adequately located, and the plurality of the series of ring-shaped mounting plate are al properly installed at their intended location with a high precision, there each of the light fixtures will be properly located with the same precision and are supposed to be as well aligned as the mounting plates are.

Therefore, for a prior-art ring-shaped mounting plates as shown in FIG. 2, the electrician may install each one of them by fixing them in the ceiling before drywall installation in the ceiling. Typically, such a ring-shaped mounting plate 100' comprising a body 110' comprising an opening 111' therein, which is circular for receiving the light fixture. The circular opening 111' is a full disk of removed material, forming a complete circle (disk) devoid of any material within the mounting plate, thus allowing direct housing of a light fixture therein. The body 110' is also pierced with small holes, for example in the corners, for securing the body 110' of the ring-shaped mounting plate 100' to a solid element of the ceiling which exists before the drywall panels are installed, for example by screwing the ring-shaped mounting plate 100' onto the furring strips of the ceiling.

There are however drawbacks associated to this method. First, alignment is still hard to perform. As the pierced corners of the ring-shaped mounting plate 100' needs to be placed onto a furring strip (e.g., aligned thereon to be screwed or nailed thereonto), the central opening 111' of the ring-shaped mounting plate 100' needs to be placed at the right location and aligned with any other central opening 111' of other ring-shaped mounting plates 100' on the same ceiling. This alignment is hard to perform because completely hollow circles need to be aligned, and the actual center of such completely hollow circular central openings 111' are hard to locate per se. This completely hollow circular central openings 111' is however made necessary by the requirement of putting a cylindrical light fixture therein afterwards (i.e., there cannot be material left in the center of the hollow circular central openings 111' to indicate its center as it would prevent the installation of the light fixture therein afterwards).

There is another drawback with the prior-art ring-shaped mounting plates 100'. After installation of such a prior-art ring-shaped mounting plates 100', it is expected that another worker will install drywall panels in the ceiling right under the prior-art ring-shaped mounting plates 100', thereby covering it, and this worker will then immediately pierce the drywall within the completely hollow circular central opening 111' and cut the drywall portion in a circular fashion to remove the part of the surface of the drywall panel aligned with the completely hollow circular central opening 111', thereby exposing the opening 111' after drywall placement by having removed the corresponding drywall portion, thereby enabling the installation of the light fixture thereinto. Doing this, however often leads to a significant amount of mineral wool, or other similar insulator which was placed in the ceiling, to fall through the opening 111' when that cut is made, which leads to a waste of a useful building material as well as putting debris on the floor unnecessarily and exposing workers eyes to fallen debris, which is a safety hazard. Moreover, afterwards, the electrician needs to come for the installation of light fixtures into each one of the ring-shaped mounting plates 100', and needs to find the wiring above the ceiling, which can be time consuming because the wiring is somewhere hidden in the ceiling on the body 110' of the ring-shaped mounting plate 100', but needs to be found by manual searching to recuperate the wires for electrical connection of the light fixture during installation.

There is described below a target ring 100, also referred to as a ring-shaped mounting plate 100 with a branched target 200, for the installation of light fixtures addressing such drawbacks, making the process more efficient both for the step of mounting-plate alignment and the step of light fixture installation, especially by providing a central target to be illuminated by an alignment laser light, and by retaining the electrical wire of the transformer on the mounting plate immediately aside a dedicated opening for easy retrieval, making the installation faster and avoiding spilling mineral wool from the roof by manual searching of such an electrical wire. The target ring comprises a body 110, which is substantially planar, in that it is flat and it extends mainly within a plane. This flat, planar body 110 forms the mounting plate for the light fixture, and it is pierced with an opening 111 for accommodating or housing a light fixture therein. Such body 110 forming the mounting plate for the light fixture is to be installed and fixedly secured in a building surface, such as a ceiling, an inclined ceiling, or even a wall, or other substantially flat surface of a building allowing the installation of recessed lights. There are piercings 114, which can be in the corners of the ring-shaped mounting plate 100, to allow screwing, nailing or otherwise securing at least one portion of the ring-shaped mounting plate 100 to the furring strip or other solid part of the ceiling for securing the ring-shaped mounting plate 100 to the ceiling. Thus, the body 110 forming the mounting plate for the light fixture is fixed within drywalls or similar surface from which the recessed light is to be installed, to accommodate or house in the opening 111 thereof the recessed light to be fixedly held therein.

According to a preferred embodiment of the disclosure, the body 110 has a substantially rectangular shape, whereby the four corners thereof have a substantially right angle. The body is made of a rigid material, typically a metallic material, which can be, without limitation, made of steel, aluminum, or any other suitable metal or alloy. For example, preferred embodiments may comprise galvanized steel or galvanized aluminum. The material should allow fabrication of the body 110 according to a suitable shape according to one of the embodiments as described herein. For example, it may be fabricated by cutting a plate of material to form the general shape of the body, and then cuts, incisions or deformations are performed by die-casting, or other similar method of imprinting shapes and cuts, onto that piece of material to create the geometrical features as described below.

According to a preferred embodiment, the material to form the body can be galvanized steel, which ensures that the ring-shaped mounting plate 100 can be used inside or outside (this material does not rust while allowing the branches to be cut off at the preferred thickness as mentioned above).

According to an embodiment of the disclosure, there is an opening 111 which is substantially circular, but which, contrarily to the prior art, is not completely hollow as it comprises a branched target 200. The branched target 200 comprises a target 201, which is a small portion of material, forming a dot or other small geometrical feature, and is located at the center of the opening 111, indicating the center thereof. The purpose of the target 201 is to indicate the center of the opening 111.

According to an embodiment, when installing (securing) the ring-shaped mounting plate 100 on the ceiling, alignment needs to be made to ensure that it is secured at the appropriate location. This can be done, for example, using a laser guide, optionally using another aid such as markers on the ground or by relative alignment with other, prior installed ring-shaped mounting plates. The laser guide provides a well localized light spot, such that when said light spot from the laser glows on the dot forming the target 201, it is known to be properly aligned and therefore the ring-shaped mounting plate 100 is located at the right location to be secured to the ceiling before any other displacement occurs.

In the branched target 200, there is also provided at least one branch 210 which is an elongated piece of material which makes a bridge between the central target 201 and a contour (solid periphery) of the opening 111, that is with the body 110 of the ring-shaped mounting plate 100. This at least one branch 210 is used as a solid bridge which holds in place the central target 201, as the central target 201 cannot float within the opening 111 and needs at least some form of solid support to keep it in place.

This at least one branch 210 can also provide another advantage, that is upon fixation onto the furring strip of the ceiling, the electrical wiring in the ceiling which is intended to power up the light to be installed within that specific ring-shaped mounting plate 100 can be drawn by the electrician from the ceiling when securing the ring-shaped mounting plate 100 onto the furring strip of the ceiling, and such wiring can be simply hooked onto, or loosely wound around, one of the at least one branch 210 for being hooked thereon. If there is more than one branch 210, all but one branch can be cut off to leave only a single branch 210 for hooking the electrical wire. The branch can then be bent upwardly and outwardly away from the center to snap the electrical wire onto the top surface of the mounting plate 100, away (aside) from the opening 111. Later on, when the drywall is laid on the ceiling and cut at the location of the opening 110, the electrical wiring will still be hooked on or wound around the same one of the at least one branch aside the opening on the top surface of the mounting plate 100, which means that upon cutting the drywall portion corresponding to the opening 110, the electrician will not cut it, and will have the corresponding electrical wiring visible and available right there just aside the opening without having to search for it above the ceiling. This is particularly advantageous for an electrical wire from a transformer, which otherwise tends to displace due to the wright and drywall panel placement and be very hard to find afterwards.

The at least one branch 210 of the branched target 200 can be provided as at least two branches 210 to provide additional advantages. First, having at least two branches, such as two or three branches as illustrated, makes the branched target 200 more solid, helping maintaining the central target 201 in the center of the opening 110 as intended, avoiding deformation or bending of the branch 210 if there is only one.

A preferable shape comprises three branches 210 which are equally angularly distant from the central target 201, forming a shape of the letter Y, with the small portion of material forming a dot at the center, which is the central target 201.

In comparison with the prior art, where the opening 110' was completely hollow, it seems counterproductive to make a non-completely hollow opening 110 as contemplated according to the present disclosure. This proposition of the present disclosure, in which a branched target 200 is provided within the opening 110, is therefore counterintuitive because it prevents the eventual installation of the light fixture therethrough, while being also more difficult to fabricate than a more plate with a completely hollow opening.

To provide for the installation of the light fixture therethrough, the branched target 200 should be easy to break off from the remainder of the ring-shaped mounting plate 100. For example, by having the branches 210 being thin enough, the branches 210 can be cut off or knocked off using an appropriate tool such as a cutter. This ensures that after installation of the ring-shaped mounting plate 100 in an aligned fashion using their target, the branched target 200 can be cut off or punched off the opening 110 and the light fixture installed therein.

According to an embodiment, one of the branches 210 (the "remaining branch") can be left uncut from the body 110 and remain in the ring-shaped mounting plate 100, after having cut all other branches 210 and having cut the target 201 from this remaining branch 210. The remaining branch can be used for holding an electrical wire hooked thereon, as mentioned above. Once the electrical wire is hooked on the remaining branch, for example by being wound therearound or intertwined, the remaining branch can then be bent (hinge at the root of the remaining branch) from the original flat position to up and away from the center of the opening to free the opening 111. After having cut all but one branch and bent away the remaining branch, it is now possible to perform the operation of opening the drywall portion corresponding to the opening 111.

Counterintuitively, the drawbacks of having a branched target in the opening (i.e., complicated to fabricate and prevention from putting the light fixture therein) are more than compensated by the advantages described above of having such a branched target in the opening, and the branched target may be easily removed just prior to the installation of the light fixture.

According to an embodiment, the thickness of the body 110 of the ring-shaped mounting plate 100 (and also of the branches 210) is between about 0.01" and about 0.05", preferably between about 0.02" and about 0.04", preferably about 0.031". The branches 210 should have the same thickness as the body 110 as they are made from within the same plate (during fabrication, it is the opening which is formed by removing the material from the original plate). This thickness is chosen among the range as disclosed at least to ensure that the branches 210 are easy to cut off or knock off from the rest of the body 110, and also that they are bendable with manual force. To further ensure that the branches 210 are easy to cut off or knock off from the rest of the body 110, while being solid enough to retain the target at its intended central location within the opening, the width of the branches 210 also needs to be chosen within a preferred range. According to an embodiment, the width of the branches 210 is between about 0.05" and about 0.20", preferably between about 0.10" and about 0.15", preferably about 0.125".

Figure 5:
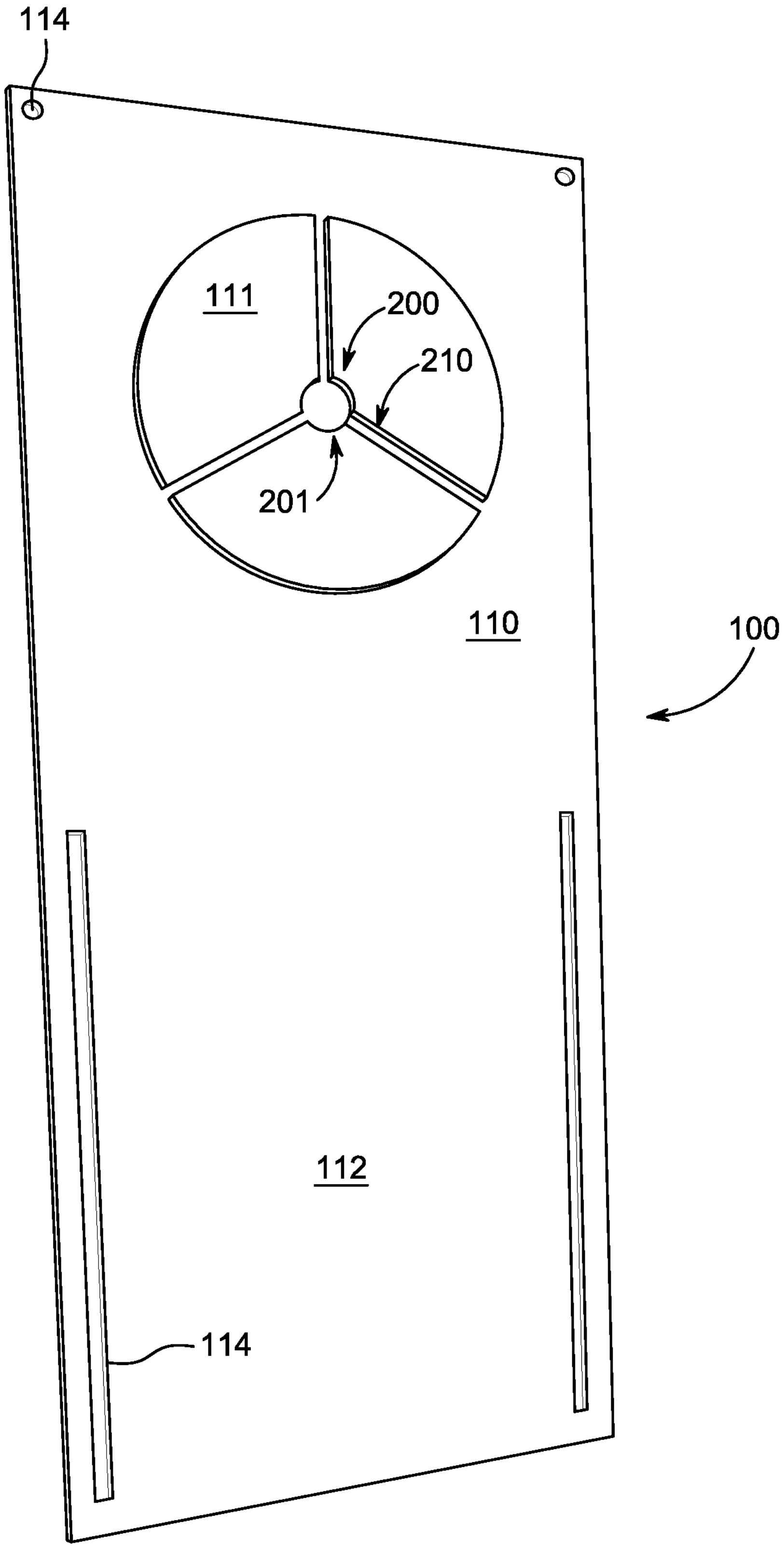
FIG. 5 is a front view illustrating a ring-shaped mounting plate with a branched target, according to another embodiment of the disclosure comprising an extended body.
Figure 6:
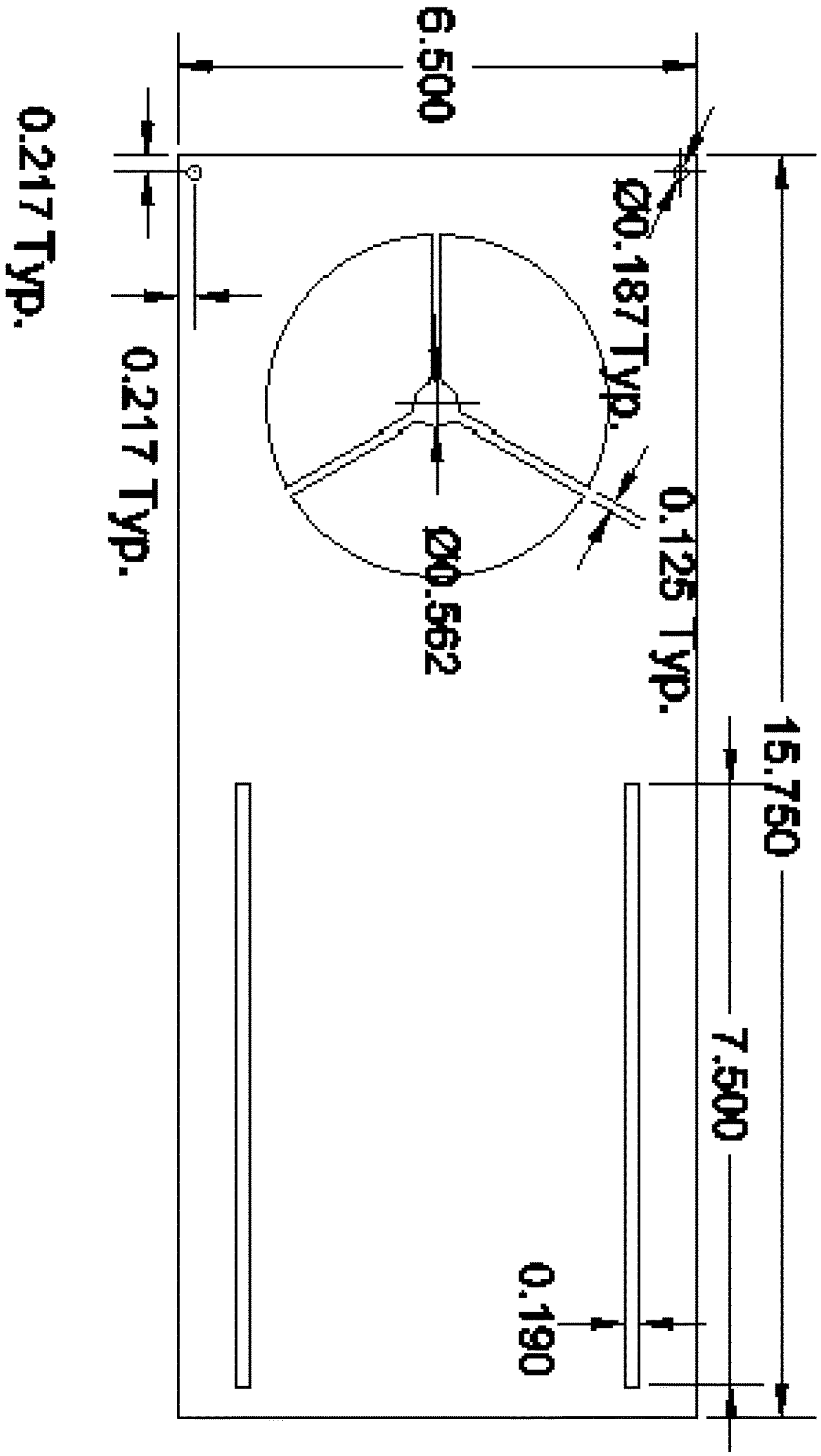
FIG. 6 is a schematic view illustrating the ring-shaped mounting plate with a branched target and extended body of FIG. 5, according to an embodiment of the disclosure.

According to an embodiment of the disclosure, and referring to FIGS. 5-6, there is shown a ring-shaped mounting plate 100 which is shaped differently, as it comprises a body 110 which is longer in at least one direction. The body 110 comprises an extender 112. The extender 112 may comprise elongated piercings 114 along the edge. The extender 112 can be used to secure the ring-shaped mounting plate 100 to a ceiling furring strip or similar element when it is more distant and requires the ring-shaped mounting plate 100 to be longer to reach said ceiling furring strip or similar element.

There is disclosed a method of installing a mounting plate in preparation of installation of a recessed light fixture, comprising the steps of:

- providing a mounting plate comprising a flat body pierced with an opening which is substantially circular, with a portion of material forming a central target at a center of the opening and at least one branch which bridges the central target to the body;
- placing the central target of the mounting plate in a ceiling by providing a laser light at a specific location and aligning the laser light on the central target of the mounting plate; and
- securing the mounting plate in the ceiling.
- installing a drywall panel and cutting a drywall opening in the drywall panel corresponding to a location of the opening.

There is also disclosed a method of installing a mounting plate in preparation of installation of a recessed light fixture, comprising the steps of:

- providing a mounting plate comprising a flat body pierced with an opening which is substantially circular, with a branch extending in the opening;
- securing the mounting plate in the ceiling;
- drawing an electrical wire from a ceiling to the branch for wounding therearound; and
- bending the branch upwardly and away from a center of the opening to snap the electrical wire onto a top surface of the flat body of the mounting plate immediately aside and away from the opening.

Bending the remaining branch upwardly and outwardly from the center of the opening to hold in place the electrical wire of the transformer right above the mounting plate, immediately aside and away from the edge of the opening, ensures that when the corresponding opening in the drywall is being cut, the electrical wire of the transformer is not cut by accident. Also, it ensures that the electrical wire of the transformer intended to the recessed light fixture is right there to be grasped by the electrician after having opened the corresponding portion of the drywall. It has several advantages, notably that the electrician does not need to insert their hand or arm in the opening to search for said electrical wire. This is fortunate because the typical action of inserting the hand or arm in the ceiling opening has the disadvantage of forcing the worker to make some movements which can hurt. Also, this action of inserting the hand or arm in the ceiling opening, typical in the prior art, has the major disadvantage of causing mineral wool, or other similar insulator which was placed in the ceiling, to fall through the opening when that cut is made, which leads to a waste of a useful building material as well as putting debris on the floor unnecessarily and exposing workers eyes to fallen debris, which is a safety hazard.

By having the electrical wire being readily available immediately aside the contour of the opening on the top surface of the flat body of the mounting plate in the ceiling, the electrical wire of the transformer is easy to find without the need for inserting the hand or arm further up in the ceiling, greatly limiting the spilling of mineral wool. Also, this makes this step faster (as it is normally time-consuming), thus augmenting the possible pace of installation.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A mounting plate for a recessed light fixture comprising:

- a body which is flat and which extends in a plane, the body being pierced with an opening which is substantially circular,
- a portion of material forming a central target at a center of the opening, the central target having a diameter;
- at least one branch which bridges the central target to the body, each of the at least one branch being longer than the diameter of the central target.

2. The mounting plate of claim 1, wherein the at least one branch comprises at least two branches.

3. The mounting plate of claim 2, wherein the at least two branches comprise three branches.

4. The mounting plate of claim 3, wherein the three branches are angularly equidistant from each other, forming a shape of a Y.

5. The mounting plate of claim 4, wherein the target is formed as a dot connecting the three branches at a center thereof.

6. The mounting plate of claim 5, wherein the diameter of the target formed as a dot is between about 0.3" and about 0.8".

7. The mounting plate of claim 6, wherein the diameter of the target formed as a dot is between about 0.5" and about 0.6".

8. The mounting plate of claim 7, wherein the branches have a width between about 0.10" and about 0.15".

9. The mounting plate of claim 7, wherein the branches have a thickness between about 0.01" and about 0.05".

10. The mounting plate of claim 1, wherein the body and the at least one branch are made of galvanized steel.

11. The mounting plate of claim 1, wherein the body is longer in a direction, forming an extender of the mounting plate.

12. A method of installing a mounting plate in preparation of installation of a recessed light fixture, comprising the steps of:

providing a mounting plate comprising a flat body pierced with an opening which is substantially circular, with a portion of material forming a central target at a center of the opening and at least one branch which bridges the central target to the body, wherein the central target has a diameter and each of the at least one branch is longer than the diameter of the central target;

placing the central target of the mounting plate in a ceiling by providing a laser light at a specific location and aligning the laser light on the central target of the mounting plate; and securing the mounting plate in the ceiling.

13. The method of claim 12, further comprising the step of installing a drywall panel and cutting a drywall opening in the drywall panel corresponding to a location of the opening.

14. The method of claim 12, wherein securing the mounting plate in the ceiling comprises securing the mounting plate to a furring strip of the ceiling.

15. The method of claim 12, wherein providing the mounting plate comprises providing the mounting plate with the flat body having an extender, and securing the mounting plate in the ceiling comprises securing the extender of the mounting plate to a furring strip of the ceiling.

16. The method of claim 12, further comprising the steps of:

drawing an electrical wire from the ceiling to one of the at least one branch for wounding therearound; and bending the branch upwardly and away from a center of the opening to snap the electrical wire onto a top surface of the flat body of the mounting plate immediately aside and away from the opening.

17. The method of claim 16, wherein the at least one branch comprises at least two branches, further comprising the step of, prior to bending the branch, cutting all of the at least two branches except the branch to be bent.

18. A method of installing a mounting plate in preparation of installation of a recessed light fixture, comprising the steps of:

providing a mounting plate comprising a flat body pierced with an opening which is substantially circular, with a branch extending in the opening;

securing the mounting plate in the ceiling;

drawing an electrical wire from a ceiling to the branch for wounding therearound; and bending the branch upwardly and away from a center of the opening to snap the electrical wire onto a top surface of the flat body of the mounting plate immediately aside and away from the opening.

19. The method of claim 18, further comprising the step of installing a drywall panel and cutting a drywall opening in the drywall panel corresponding to a location of the opening.

20. The method of claim 18, wherein securing the mounting plate in the ceiling comprises securing the mounting plate to a furring strip of the ceiling.

* * * * *